United States Patent
Woodson et al.

(10) Patent No.: US 8,182,583 B1
(45) Date of Patent: May 22, 2012

(54) MERCURY CONTROL ACTIVATED CARBON MANAGEMENT

(75) Inventors: Damon Eric Woodson, Macon, GA (US); Charles Walter Conner, Macon, GA (US); Lawrence Petoia, Atlanta, GA (US); Calvin J. Hohenshell, Fernandina Beach, FL (US)

(73) Assignee: Southern Company Services, Inc., Atlanta, GA (US)

( * ) Notice: Subject to any disclaimer, the term of this patent is extended or adjusted under 35 U.S.C. 154(b) by 398 days.

(21) Appl. No.: 12/584,781

(22) Filed: Sep. 11, 2009

(51) Int. Cl.
*B01D 53/06* (2006.01)
*B01D 53/64* (2006.01)

(52) U.S. Cl. .............. 95/113; 95/107; 95/134; 96/111; 96/112; 96/116; 96/150; 110/345

(58) Field of Classification Search .............. 96/109, 96/111, 112, 115, 116, 150; 95/1, 8, 13, 95/14, 107, 108, 134; 110/203, 345; 423/210
See application file for complete search history.

(56) References Cited

U.S. PATENT DOCUMENTS

| | | | | |
|---|---|---|---|---|
| 5,695,726 A * | 12/1997 | Lerner | | 423/210 |
| 7,713,503 B2 * | 5/2010 | Maly et al. | | 423/210 |
| 7,776,141 B2 * | 8/2010 | Wu et al. | | 96/150 |
| 2006/0048646 A1 * | 3/2006 | Olson et al. | | 95/134 |
| 2008/0314242 A1 * | 12/2008 | Cochran et al. | | 95/1 |
| 2011/0209609 A1 * | 9/2011 | Bansal et al. | | 95/8 |

* cited by examiner

*Primary Examiner* — Frank Lawrence, Jr.
(74) *Attorney, Agent, or Firm* — John J. Timar; Womble Carlyle Sandridge & Rice, LLP

(57) ABSTRACT

A method, system, and computer readable storage medium for managing powdered activated carbon (PAC) injections for controlling mercury emissions from coal-fired boilers. A mercury concentration value received from a mercury continuous emissions monitor is stored in the plant control system database. A PAC injection rate from an activated carbon injection system also is stored in the plant control system database. If the mercury concentration value is greater than the mercury setpoint, a signal is sent to the activated carbon injection system to increase PAC injection by a predetermined value. If the mercury concentration value is less than the mercury setpoint, a signal is sent to the activated carbon injection system to decrease PAC injection by a predetermined value.

24 Claims, 8 Drawing Sheets

MERCURY CONTROL ACTIVATED CARBON MANAGEMENT

TECHNICAL FIELD

The invention relates generally to controlling the emission of mercury from combustion gases in a power plant and, more particularly, to managing use of activated carbon to control the emission of mercury within a specified range.

BACKGROUND OF THE INVENTION

Previous solutions for controlling mercury emission in combustion gases have only focused on mercury reduction without consideration of the cost of activated carbon. However, a power plant operator can save a significant amount of money by using only as much of the activated carbon materials as needed to meet the operational goals.

Emissions of hazardous pollutants, such as mercury, from power plants must be controlled due to environmental concerns. Coals contain mercury which is released into the atmosphere as elemental and oxidized mercury along with the flue gases resulting from combustion. Unless the mercury is removed from the coal prior to its combustion, it becomes extremely difficult to remove mercury effectively and economically once it becomes a part of the flue gas. One technology for controlling mercury emission is to inject a suitable sorbent into the combustion gases. Powdered activated carbon and various other sorbents are capable of removing mercury by sorption.

Coals contain many impurities including ash, sulfur, mercury, arsenic, selenium, beryllium, boron, etc. When coal is burned in a furnace, it is converted to carbon dioxide and water producing heat. The ash remains behind as a residue while the majority of other impurities, including sulfur, mercury, and arsenic leave with the combustion gases.

Depending upon the firing practices utilized, the ash is removed as bottom ash or as a combination of bottom and fly ash. The fly ash is that portion of the ash that becomes entrained in the combustion gases and moves around with them into the various parts of the boiler or combustion systems. Since the ash is entrained with the combustion gases, it is removed from the combustion gases before the gases are discharged into the atmosphere through chimneys or stacks. The separation of the entrained ash from the combustion gases is accomplished by utilizing particulate control devices such as electrostatic precipitators and baghouses.

Although mercury emissions from power plants are very small in comparison to ash, sulfur oxides, and nitrogen oxides, mercury emissions are targeted for control due to mercury's tendency to bio-accumulate and its potency as a neurotoxin.

Mercury is emitted from the stacks with the combustion gases in the form of elemental and oxidized mercury. Various methods are currently being employed to control the emission of mercury from the stack gases. Most of the processes require injection of a mercury specific sorbent into the combustion gas stream. The sorbent is injected prior to the particulate control device so that the sorbent containing the adsorbed mercury is removed by the particulate control device together with the fly ash.

Powdered activated carbon is one of the most effective sorbents for mercury removal. The powder activated carbon is blown in by compressed air into the combustion gases upstream of the particulate control device at gas temperatures between 250° F. and 800° F. In the case of cold side electrostatic precipitators and baghouses the temperatures range between 250° F. and 400° F. The hot side electrostatic precipitators operate around 800° F. The powdered carbon works best when the gas temperatures are low.

SUMMARY

The embodiments of the invention focus on both powdered activated carbon (PAC) cost containment and effective reduction in mercury emissions from coal-fired boilers. The main advantage of the disclosed embodiments is cost control for the powdered activated carbon that is injected into flue gases exhausted from coal-fired boilers.

In an exemplary embodiment, a method is provided for managing powdered activated carbon (PAC) injections for controlling mercury emissions from coal-fired boilers. An operator selectable setpoint for a mercury concentration in flue gases and a timer setpoint for checking the mercury concentration in flue gases exiting though a gas exhaust stack are stored in a plant control system database. A mercury concentration value received from a mercury continuous emissions monitor is stored in the plant control system database. A PAC injection rate from an activated carbon injection system is stored in the plant control system database. If the processing logic for managing PAC injections is running on a plant control system processor, the mercury concentration setpoint, the mercury concentration value, the timer setpoint, and a rate of PAC injection are read from the plant control database. If the mercury concentration is greater than the mercury setpoint, a signal is sent to the activated carbon injection system to increase PAC injection by a predetermined value. If the mercury concentration is less than the mercury setpoint, a signal is sent to the activated carbon injection system to decrease PAC injection by a predetermined value. The mercury concentration in flue gases is rechecked after a time interval equal to the timer setpoint has elapsed.

BRIEF DESCRIPTION OF THE DRAWINGS

These and other advantages and aspects of the present invention will become apparent and more readily appreciated from the following detailed description of the invention taken in conjunction with the accompanying drawings, as follows.

DETAILED DESCRIPTION

Figure 1:
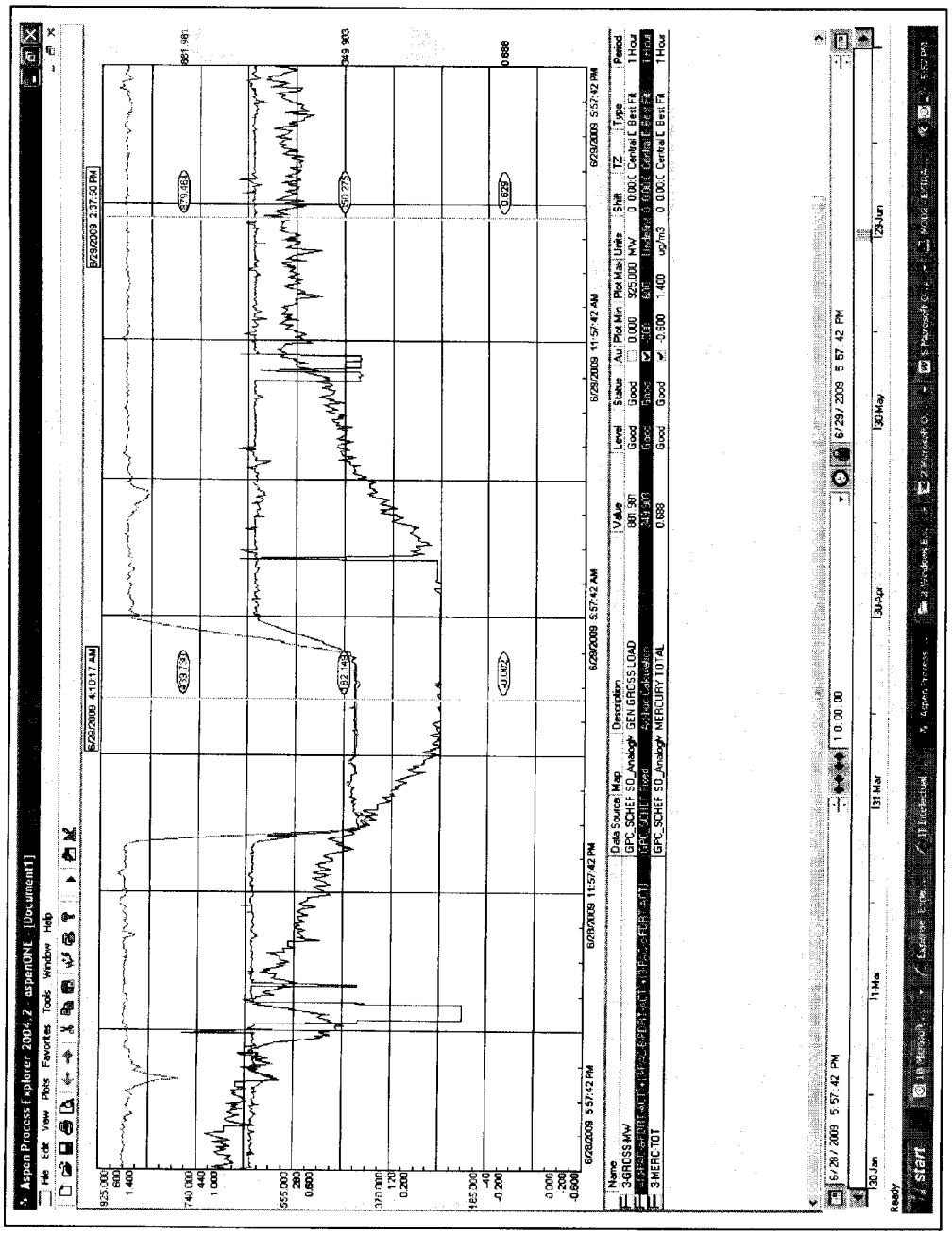
FIG. 1 illustrates a prior art mercury activated carbon control process in which too much powdered activated carbon is being injected as a sorbent for mercury.

The following description is provided as an enabling teaching of the invention and its best, currently known embodiments. Those skilled in the relevant art will recognize that many changes can be made to the embodiments described, while still obtaining the beneficial results. It will also be apparent that some of the desired benefits of the embodiments described can be obtained by selecting some of the features of the embodiments without utilizing other features. Accordingly, those who work in the art will recognize that many modifications and adaptations to the embodiments described are possible and may even be desirable in certain circumstances, and are a part of the invention. Thus, the following description is provided as illustrative of the principles of the embodiments of the invention and not in limitation thereof, since the scope of the invention is defined by the claims.

As used herein, the terms "baghouse," "economizer," and "precipitator" have their normal and customary meaning as used in the power generation industry. A baghouse is a fabric collector that uses filtration to separate particulates from exhaust gases. The common types of baghouses and their operation are well known in the art and will not be discussed here. Likewise, precipitators use electrostatic forces to separate particles from exhaust gases. The types of precipitators and their operation are also well known in the art. Flue gases from large boilers are typically 450° F. to 650° F. Economizers recover some of this heat for pre-heating boiler feed water. Economizers are basically heat exchangers with hot flue gas on one side and water on the other.

Mercury Control Activated Carbon Management Software was developed to minimize the cost of powder activated carbon (PAC) used for mercury control, by minimizing injection quantities of the PAC through use of control software. It is anticipated that upcoming mercury control legislation will require most coal burning plants to inject PAC for mercury control. Powdered activated carbon (PAC) is a leading mercury control technology, and this technology will remove significant percentages of mercury from a coal plant's flue gas. The injection of PAC is normally downstream of existing precipitators and collected in a baghouse built to capture the sorbent. The mercury in the flue gas is collected in the PAC, and then the PAC is collected and land filled as a solid waste. This PAC injection method is used by several utilities and is an air pollution control process developed by the Electric Power Research Institute (EPRI) named TOXECON®. The TOXECON control process is fully described in U.S. Pat. No. 6,451,094 and U.S. Pat. No. 6,558,454, both of which are incorporated by reference herein. Normally the amount of PAC that is injected is controlled by either a flue gas flow or boiler load megawatt (MW) signal. EPRI testing has resulted in a control method which is to inject a ratio of the pounds of PAC per amount of flue gas. Minimum MW (or minimum flue gas) is tied to a minimum PAC injection; maximum PAC injection is tied to maximum flue gas flow (or maximum MW). This control method provides a linear control.

FIG. 1 illustrates a prior art mercury activated carbon control process. The graph plots generator gross load in megawatts, PAC injection rate in pounds per hour, and total mercury concentration in micrograms per cubic meter over a 24 hour period. The numeric values on the graph represent specific values of gross load, PAC injection rate, and total mercury concentration at three different times. The top value is the gross load (e.g., 881.981 megawatts). The middle value if the PAC feed rate (e.g., 349.903 lb/hr), and the bottom value is the total mercury concentration (e.g., 0.688 µg/m³). From the graph illustrated in FIG. 1, the existing controls inject too much PAC because the mercury level is below the desired value of 0.94 micrograms/cubic meter (i.e., approximately 90% removal of mercury). If the injection rate can be reduced and the mercury level still kept below 0.94 micrograms/cubic meter, then there is a potential large savings in amount of PAC used. On a large coal fired unit this could easily be tens of thousands or hundreds of thousands of dollars a year.

The effectiveness of the PAC injection to control mercury emissions varies with several parameters including flue gas temperature and the amount of chlorine in the coal being burned. The effectiveness is very temperature dependent, and if flue gas goes over 300° F. the effectiveness of the PAC decreases significantly changing the amount needed for injection. Also, the amount of mercury in the coal burned affects the effectiveness as does the chlorine content of the coal and changes the amount needed for injection. All these parameters change and the desired result may not be achieved from the standard injection scheme which injects pounds of PAC per million actual feet/minute of flue gas. PAC may be over injected (PAC costs about $1/lb in 2009 dollars), or under injected and not obtain the removal percentage desired due to the changing inlet conditions which cannot be controlled. At a large unit, typical PAC injection rates to control mercury to 80 to 90% removal are approximately 200 to 1000 lbs/hr.

At approximately $1/lb, PAC is a large Operations and Maintenance (O&M) cost at these rates, and significant cost savings can be achieved if the controls can be changed to "trim" PAC so that it is not over injected or under injected to control mercury. The disclosed embodiments ensure that PAC is injected at the proper rate both to achieve mercury control and to minimize PAC costs. In one exemplary embodiment, three separate feeders are used to inject PAC into a flue gas stream.

Figure 8:
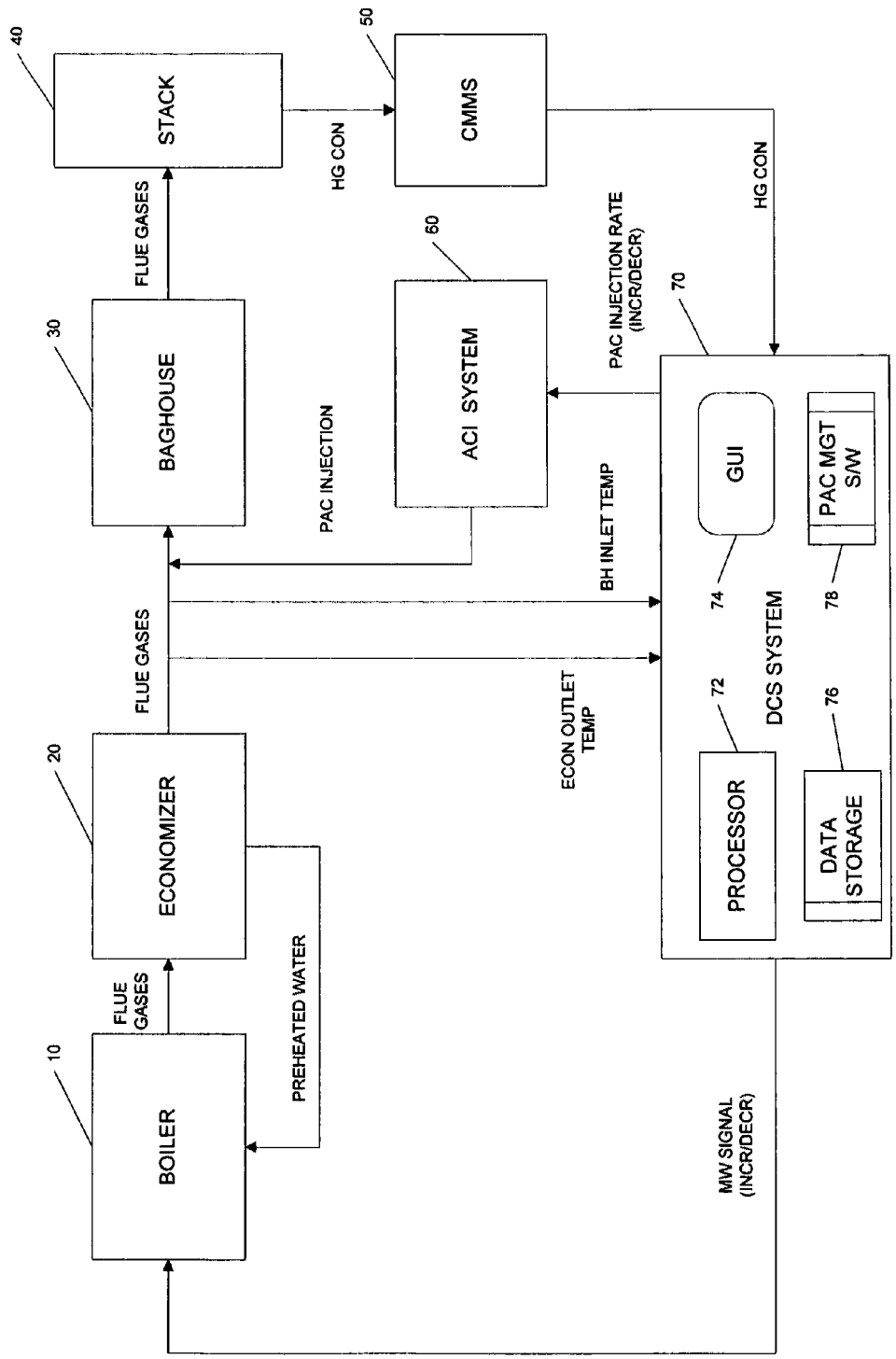
FIG. 8 illustrates a power plant control system in which the exemplary embodiments of the PAC management process can be implemented.

FIG. 8 illustrates a power plant control system in which the exemplary embodiments of the PAC management process can be implemented. The power plant components shown in FIG. 8 include boiler 10, economizer 20, baghouse 30, and stack 40. Other components of the plant control system include a Common Model Management System (CMMS) 50, Activated Carbon Injection System 60, and Distributed Control System (DCS) 70. The DCS includes a processor component 72, a data storage component 76, an operator graphical user interface (GUI) 74, and PAC management control software component 78 that executes on processor 72. Mercury concentration in the flue gases exiting the stack 40 is measured by a mercury continuous emissions monitor and the measurement is sent to CMMS 50. This value is also provided by the CMMS 50 to DCS 70 as an input to the PAC management software 78 that executes on the processor 72. The economizer outlet temperature and the baghouse inlet temperature are two other measured variables provided to DCS 70 to input into PAC management software 78. Operator GUI 74 enables the DCS 70 operator to enter setpoints into PAC software 78 for mercury concentration target, PAC management on/off pushbutton controls, economizer outlet temperature, baghouse inlet temperature, timer countdown, and PAC injection rate increase or decrease. The PAC injection rate change is provided as an analog signal to the ACI system 60 as further described below. In an alternative implementation, the PAC management software can be implemented on a programmable logic controller (PLC) instead of a DCS system.

The ACI system 60 is commercially available from vendors such as ADA Environmental Solutions and Norit Americas Inc. ACI systems pneumatically inject powdered activated carbon from a storage silo into the flue gas ductwork upstream of baghouse 30 where it adsorbs mercury and is collected along with fly ash. ACI systems include DCS terminal blocks for integration with plant controls and, optionally, can have programmable logic controller (PLC) controls. Further description of ACI systems is not needed here since such information is readily available online from vendors that provide activated carbon injection systems for removing mercury from coal-fired boiler flue gases.

Figure 2:
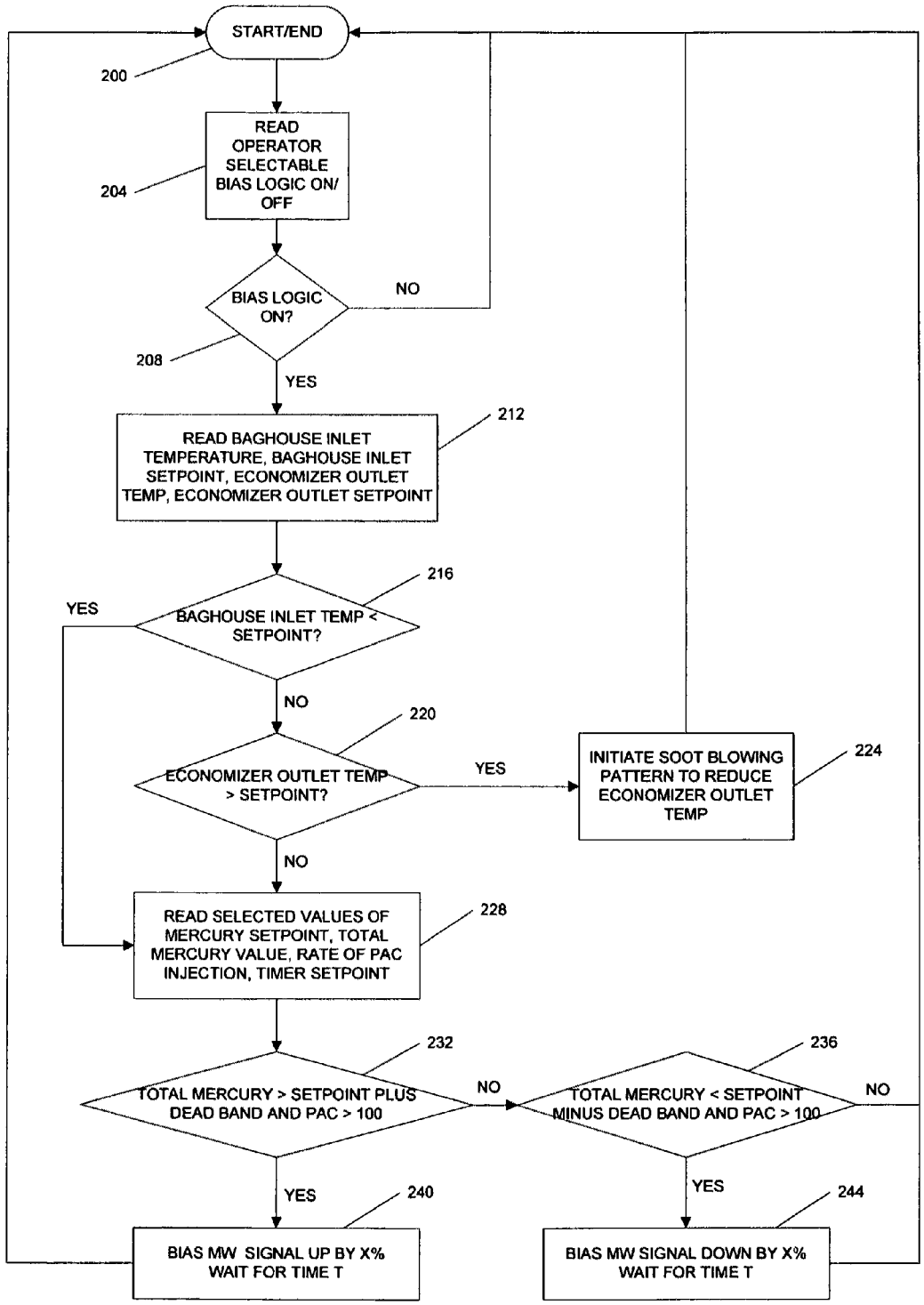
FIG. 2 illustrates a powdered activated carbon management processing logic in an exemplary embodiment.

The PAC management processing logic is illustrated graphically in FIG. 2. The processing logic is implemented in a Distributed Control System such as is available from Invensys PLC under its Foxboro® brand. The process starts and/or ends in block 200. In the first processing step indicated in block 204, the operator selectable bias logic is read to determine if the bias logic is on or off. In decision block 208, if the bias logic is off, the processing logic returns to block 200. If the bias logic is on, i.e., PAC management on), then the baghouse inlet temperature, the baghouse operator selectable baghouse inlet temperature setpoint, the economizer outlet temperature, and the operator selectable economizer outlet temperature are read, as indicated in logic block 212.

In decision block 216, a determination is made as to whether or not the baghouse inlet temperature is less than the operator selected baghouse inlet temperature setpoint. If the inlet temperature is greater than the setpoint, a further test is performed as indicated in decision block 220, to determine if the economizer outlet temperature is greater than the economizer outlet temperature setpoint. If the baghouse inlet temperature and economizer outlet temperature are both greater than the corresponding operator selectable setpoints, a sootblowing pattern is initiated in the boiler to reduce the economizer outlet temperature, as indicated in logic block 224.

If the baghouse inlet temperature is less than the baghouse inlet temperature setpoint in decision block 216, or if the economizer outlet temperature is less than the economizer outlet temperature setpoint in decision block 220, then the logic processing continues in logic block 228. In this step, the selected value of mercury setpoint, the total mercury value, the rate of PAC injection, and a timer setpoint are read. The total mercury concentration value is read from a control monitoring system such as the Spectrum Power Common Model Management System (CMMS) available from Siemens Energy, Inc. The timer setpoint is set by the operator and represents the time after changing the bias up or down before executing the PAC management control processing logic. The minimum timer setpoint value is 20 minutes. Since the response time to the bias up or down signal is slow, the timer setpoint can be set as high as two to four hours.

The next step is indicated in decision block 232. First, the total mercury concentration value is compared with the setpoint plus a dead band range. If the total mercury concentration value exceeds the setpoint plus the dead band range, then the PAC injection rate is compared to a threshold value (e.g., 100 lbs/hr). This means that the actual mercury concentration is greater than the setpoint, so more PAC needs to be injected. If the PAC injection rate exceeds the threshold value, the megawatt signal is increased by a predetermined percentage (such as 3%) by sending a signal to the PAC feeder system to increase the PAC injection rate as indicated in logic block 240. The second step in logic block 240 is to wait for a time T as set by the operator in the timer setpoint before repeating the entire processing logic by returning to block 200.

In decision block 232, if the total mercury concentration value is less than the setpoint plus the dead band, processing continues as shown in decision block 236. If the total mercury concentration value is less than the setpoint minus the dead band, and the PAC injection rate is greater than the threshold value (e.g. 100 lbs/hr), then the megawatt signal is decreased by a predetermined percentage (such as 3%) by sending a signal to the PAC feeder system to decrease the PAC injection rate as indicated in logic block 244. In other words, the PAC injection rate is too high and needs to be decreased by decreasing the megawatt signal. The final step in logic block 244 is to wait for a time T as set by the operator in the timer setpoint before repeating the entire processing logic by returning to block 200. The predetermined percentage could be set at a different value than 3%. For example, the predetermined percentage could be in the range form from 2% to 4% in other implementations.

Parameters and pseudocode for the PAC management processing logic are as follows:
V=value read from CMMS for total mercury concentration in micrograms/cubic meter
M=4 ma to 20 ma signal scales 0 MW=4 ma and 1000 MW=20 ma
Y=operator selectable setpoint of mercury in micrograms/cubic meter
DB=operator selectable dead band of mercury in micrograms/cubic meter
X=total rate of PAC injection (sum of 3 feeders actual output) lbs/hr
T=operator selectable timer setpoint
A=operator selectable on/off for bias logic
TX=baghouse inlet temperature
TXT=operator selectable baghouse inlet temperature setpoint (fixed)
EOT=economizer outlet temperature
EOTX=operator selectable economizer outlet temperature setpoint
Pseudocode:
Start
Read Value of A
If A is in "On" goto next step, if A is "Off" goto END
Read TX, TXT, EOT, and EOTX
If TX<TXT deg F goto next step
If TX>TXT and EOT>EOTX, then initiate sootblowing in pattern to reduce EOT
Read selected values of Y, V, X and T
If any value is not readable, place A in "Off" and goto END
If V>(Y+DB) AND if X>100 then bias MW signal up (increase) by 3%
If V<Y then goto next step
If V<(Y-DB) AND if X>100 then bias MW signal down (decrease) by 3%, then go to next step
Wait for time T
END (go back to Start and repeat steps)

Figure 3:
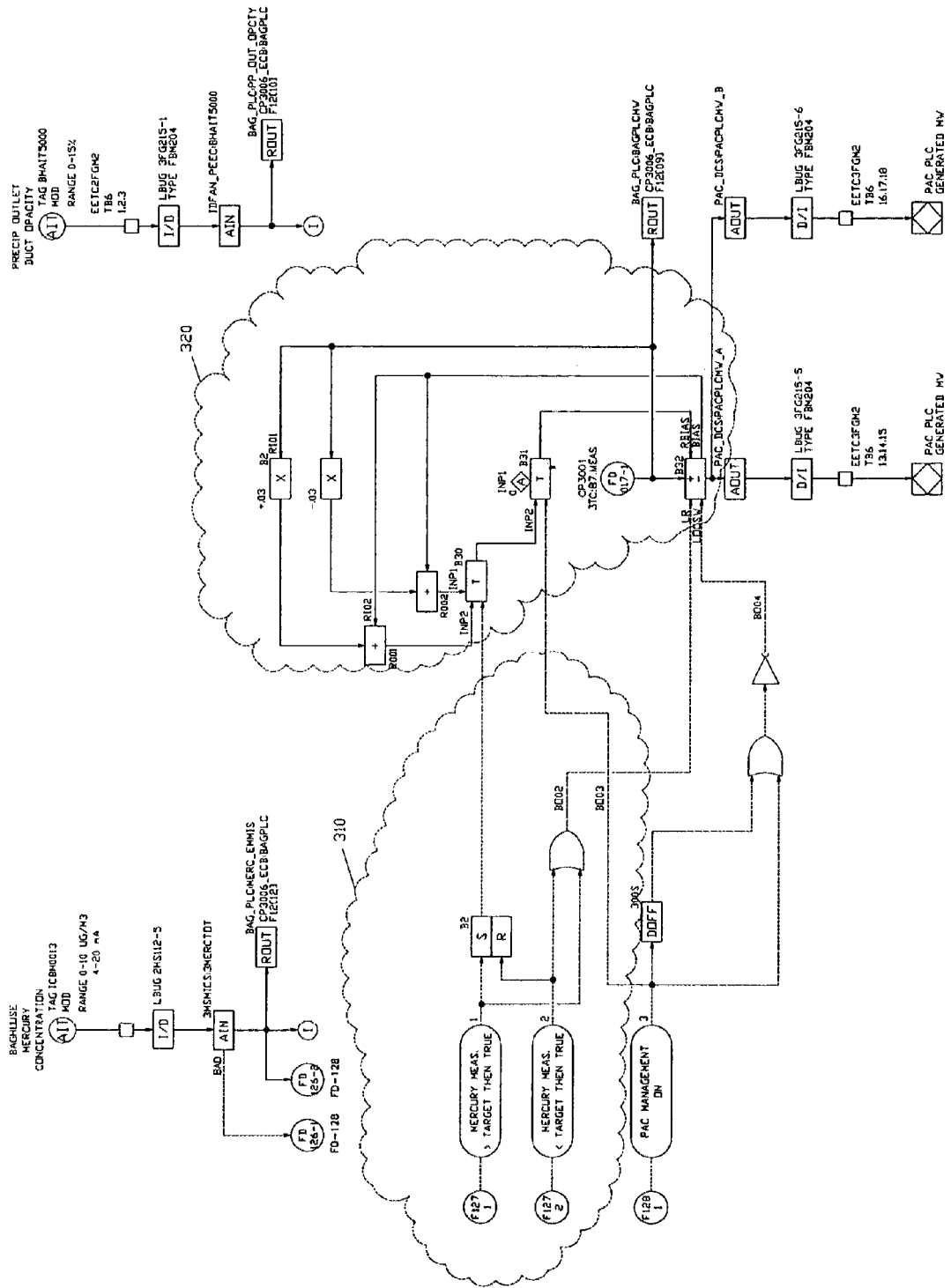
FIGS. 3-5 illustrate logic diagrams for the PAC management control process in an exemplary embodiment.
Figure 4:
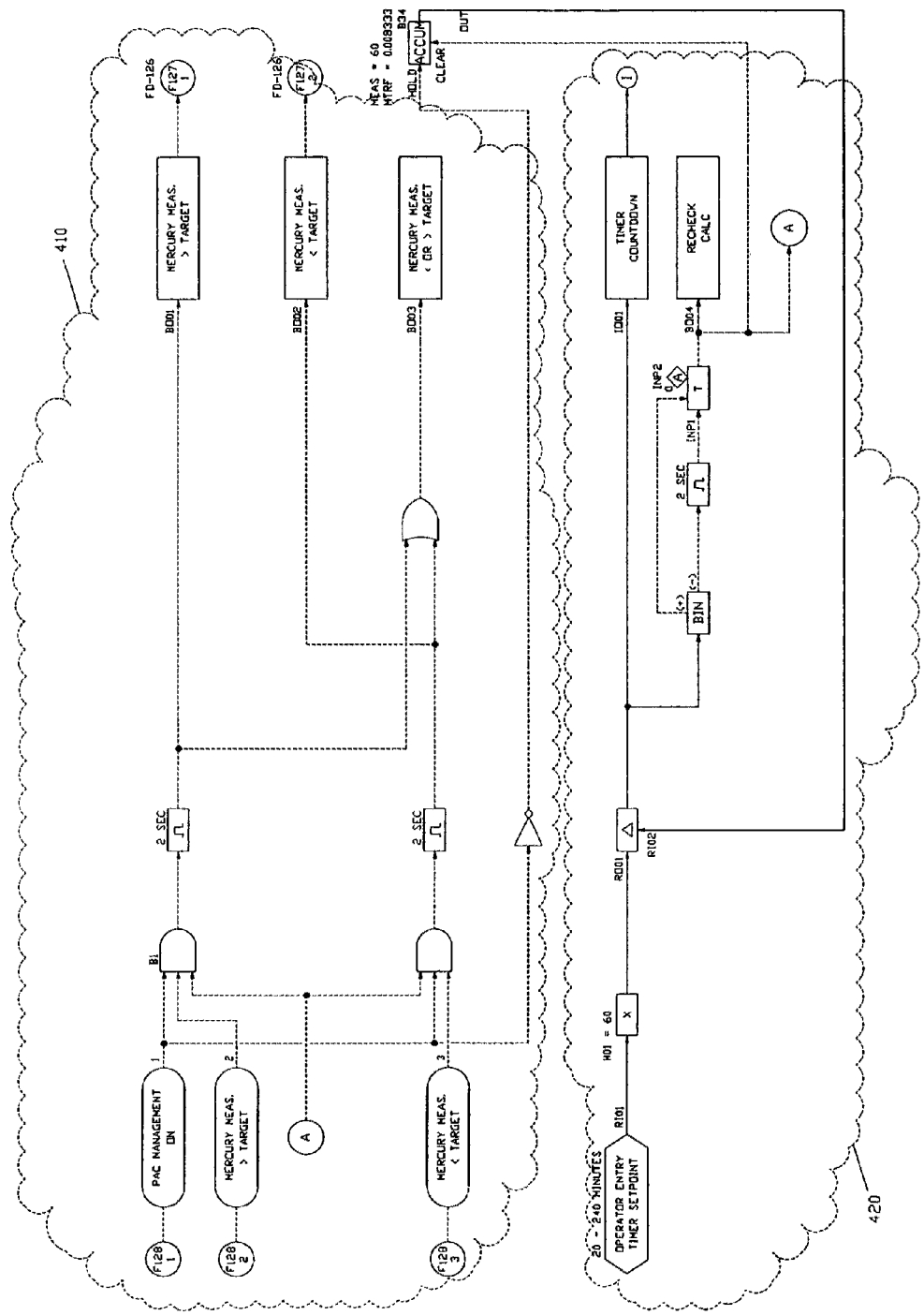
Figure 5:
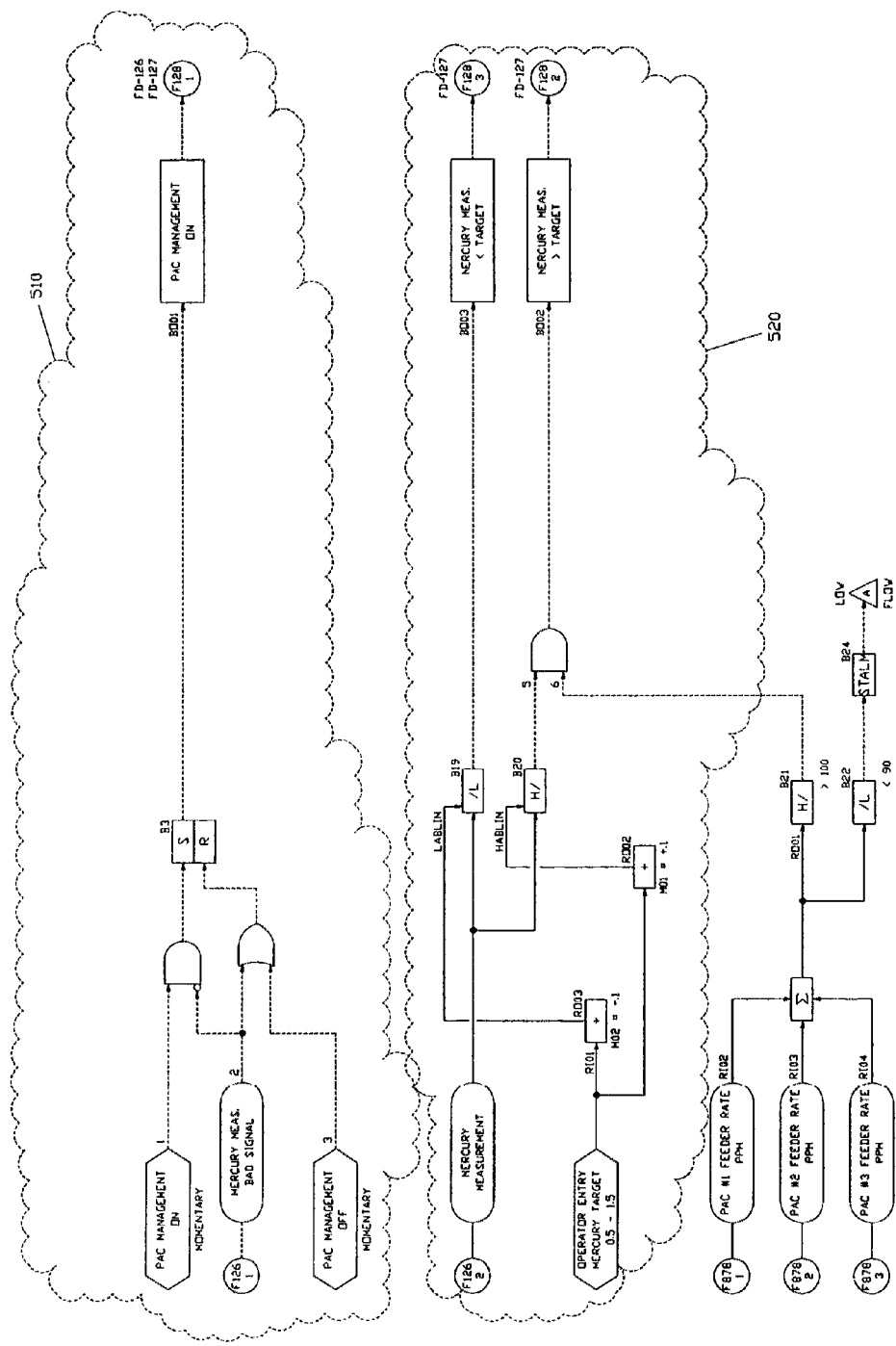

Exemplary logic diagrams for the PAC management control process are illustrated in FIGS. 3-5. With reference to FIG. 3, two sections of the logic diagram are highlighted by reference numerals 310, 320. The logic components in section 310 set the bias direction as positive or negative. If the mercury measurement exceeds the target (i.e., setpoint), the bias direction is set to positive. If the mercury measurement is less than the target (i.e., setpoint), the bias direction is set as negative. The logic components in section 320 initially add or subtract X % (e.g., 3%) to or from the original megawatt signal. Additional bias is added (or subtracted) in the same step percentage change if the mercury concentration is outside the target limits.

With reference to FIG. 4, two sections of the logic diagram are highlighted by reference numerals 410, 420. The logic components in section 410 check for PAC management being on, and mercury concentration measurement being greater or less than the target concentration. This section of components also sets the downstream logic for the bias direction as positive or negative, and rechecks the mercury concentration against the setpoint after the timer expires. The logic components in section 420 receive the operator entry timer setpoint for the sampling interval time and set the timer counting down for resample of mercury concentration against target upon timer expiration.

With reference to FIG. 5, two sections of the logic diagram are highlighted by reference numerals 510, 520. The logic components in section 510 receive the PAC management on or off signal via a pushbutton on the user interface shown in FIG. 6. PAC management remains on as long as the mercury measurement has good quality. The logic components in section 520 receive operator entry of mercury target from the graphical user interface of FIG. 6. Logic components in this section add and subtract 0.1 to/from the mercury target to establish the dead band trigger points. Logic components interrogate the mercury measurement to determine if it is greater than or less than the mercury target.

Figure 6:
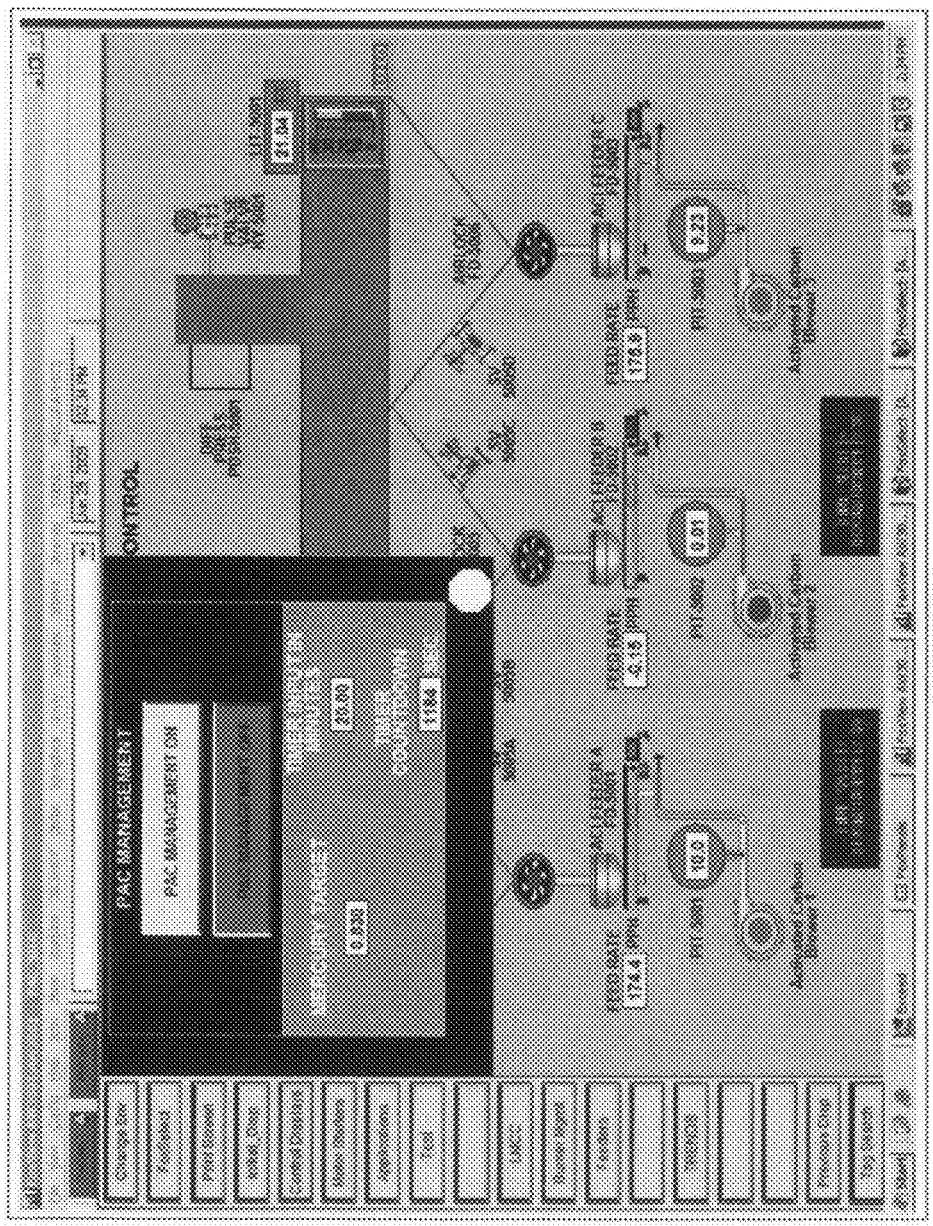
FIG. 6 illustrates a graphical user interface for the PAC management control process in an exemplary embodiment.

FIG. 6 illustrates an exemplary graphical user interface for the PAC management control process. There is an operator pushbutton to turn PAC management on or off. The user interface shows the mercury target (i.e., setpoint), timer input in minutes, and timer countdown in seconds. The user interface further shows the actual feed rate for each of the three activated carbon injectors in pounds per hour.

Figure 7:
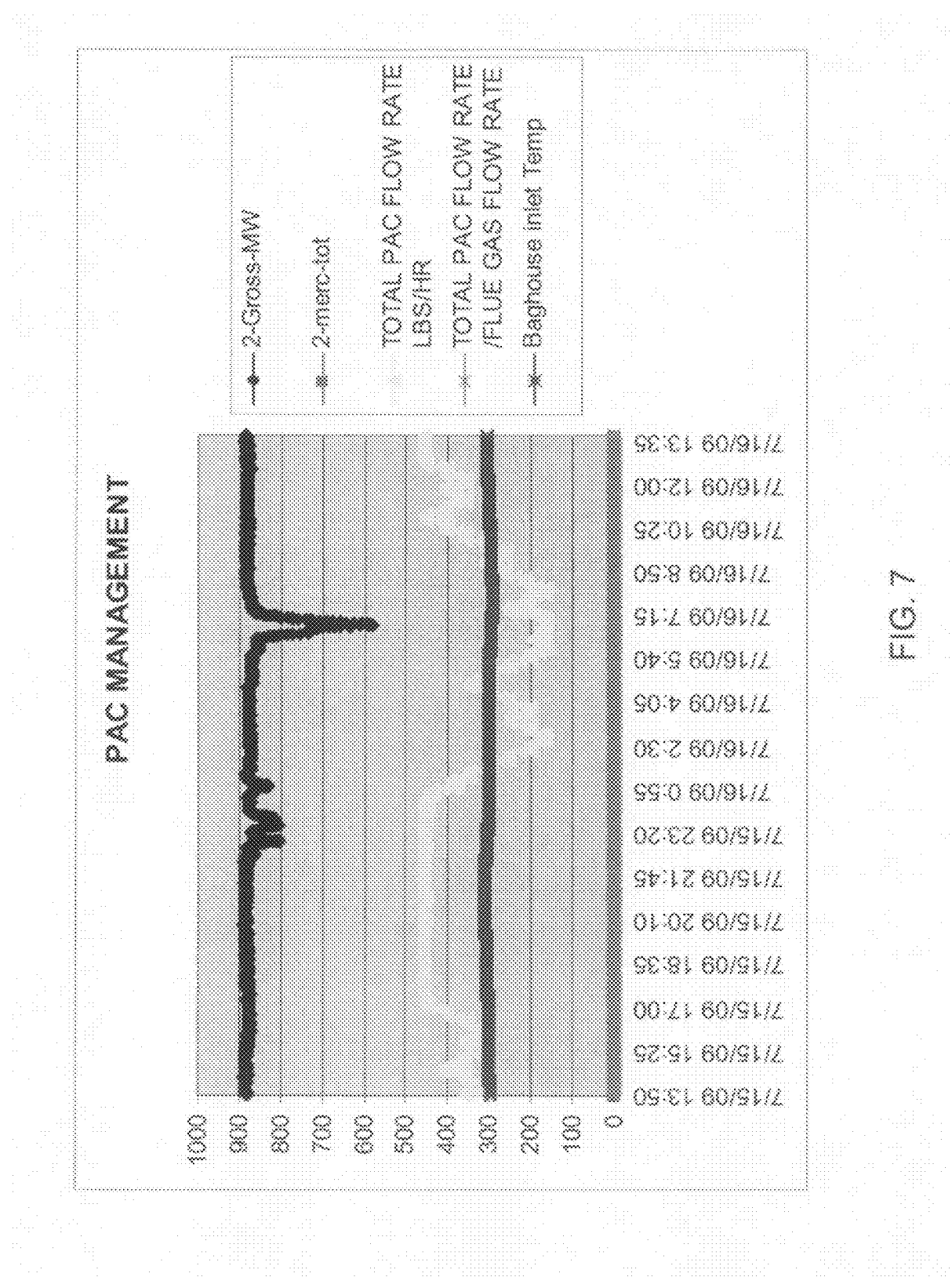
FIG. 7 illustrates graphs of generator load (megawatts), total PAC flow rate (lbs/hr), baghouse inlet temperature (° F.), and total mercury concentration over a 24 hour time period for a power plant unit using the PAC management process described herein.

FIG. 7 illustrates graphs of generator load (megawatts), total PAC flow rate (lbs/hr), baghouse inlet temperature (° F.), and total mercury concentration over a 24 hour time period for a power plant unit using the PAC management process described herein.

Embodiments of the invention have been described as computer-implemented processes. It is important to note, however, that those skilled in the art will appreciate that the mechanisms of the embodiments described are capable of being distributed as a program product in a variety of forms, and that the invention applies regardless of the particular type of computer readable storage media utilized to carry out the distribution. Examples of computer readable storage media include, without limitation, recordable-type media such as CompactFlash cards, portable hard drives, diskettes, CD ROMs, memory sticks, and flash drives.

The corresponding structures, materials, acts, and equivalents of all means plus function elements in any claims below are intended to include any structure, material, or acts for performing the function in combination with other claim elements as specifically claimed. Those skilled in the art will appreciate that many modifications to the exemplary embodiments are possible without departing from the scope of the present invention.

In addition, it is possible to use some of the features of the embodiments described without the corresponding use of other features. Accordingly, the foregoing description of the exemplary embodiments is provided for the purpose of illustrating the principles of the invention, and not in limitation thereof, since the scope of the invention is defined solely by the appended claims.

What is claimed:

1. A method for managing powdered activated carbon (PAC) injections for controlling mercury emissions from coal-fired boilers, comprising the steps of:
storing (i) an operator selectable setpoint for a mercury concentration in flue gases, and (ii) a timer setpoint for checking the mercury concentration in flue gases exiting through a gas exhaust stack in a plant control system database;
storing a mercury concentration value received from a mercury continuous emissions monitor in the plant control system database;
storing a PAC injection rate from an activated carbon injection system in the plant control system database;
determining if the processing logic for managing PAC injections is running on a plant control system;
reading the mercury concentration setpoint, the mercury concentration value, the timer setpoint, and a rate of PAC injection from the plant control database;
comparing the mercury concentration value to the mercury setpoint by the plant control system;
comparing the PAC injection rate to a PAC injection threshold value;
sending a signal from the plant control system to the activated carbon injection system to increase PAC injection by a predetermined amount if the mercury concentration value is greater than the mercury setpoint, and if the PAC injection rate exceeds the PAC injection threshold value; and
sending a signal from the plant control system to the activated carbon injection system to decrease PAC injection by a predetermined amount if the mercury concentration is less than the mercury setpoint, and if the PAC injection rate exceeds the PAC injection threshold value.

2. The method for managing powdered activated carbon (PAC) injections of claim 1 further comprising rechecking the mercury concentration in flue gases after a time interval equal to the timer setpoint has elapsed.

3. The method for managing powdered activated carbon (PAC) injections of claim 1 wherein the predetermined amount is a fixed percentage of the PAC injection rate.

4. The method for managing powdered activated carbon (PAC) injections of claim 3 wherein the fixed percentage of the PAC injection rate is in the range from about 2% to about 4%.

5. The method for managing powdered activated carbon (PAC) injections of claim 1 wherein the timer setpoint is in a range from about 20 minutes to about four hours.

6. The method for managing powdered activated carbon (PAC) injections of claim 1 wherein the step of comparing the mercury concentration value to the mercury setpoint includes a dead band range above and below the mercury setpoint in which the PAC injection rate is left unchanged.

7. The method for managing powdered activated carbon (PAC) injections of claim 1 further comprising storing an economizer outlet temperature setpoint and a baghouse inlet temperature setpoint in the plant control system database.

8. The method for managing powdered activated carbon (PAC) injections of claim 7 further comprising storing an economizer outlet temperature and a baghouse inlet temperature in the plant control system database.

9. The method for managing powdered activated carbon (PAC) injections of claim 8 further comprising comparing the baghouse inlet temperature with the baghouse inlet temperature setpoint, and if the baghouse inlet temperature exceeds the baghouse inlet temperature setpoint, comparing the economizer outlet temperature with the economizer outlet temperature setpoint.

10. The method for managing powdered activated carbon (PAC) injections of claim 9 further comprising the step of initiating a soot blowing pattern in the boiler to reduce the economizer outlet temperature if the economizer outlet temperature exceeds the economizer outlet temperature setpoint.

11. A system for managing powdered activated carbon (PAC) injections for controlling mercury emissions from coal-fired boilers, comprising:
a computer processor for executing a plurality of software components and communicating with at least one database;
a memory for storing the at least one database;
a component for storing (i) an operator selectable setpoint for a mercury concentration in flue gases, and (ii) a timer setpoint for checking the mercury concentration in flue gases exiting through a gas exhaust stack in a plant control system database;

a component for storing a mercury concentration value received from a mercury continuous emissions monitor in the plant control system database;

a component for storing a PAC injection rate from an activated carbon injection system in the plant control system database;

a component for determining if the processing logic for managing PAC injections is running on a plant control system processor;

a component for reading the mercury concentration setpoint, the mercury concentration value, the timer setpoint, and a rate of PAC injection from the plant control database;

a component for comparing the mercury concentration value to the mercury setpoint;

a component for comparing the PAC injection rate to a PAC injection threshold value; and a component, cooperative with each component for comparing, for sending a signal to the activated carbon injection system to increase or decrease the PAC injection by a predetermined amount if the PAC injection rate exceeds the PAC injection threshold value.

12. The system for managing powdered activated carbon (PAC) injections of claim 11 further comprising a component for rechecking the mercury concentration in flue gases after a time interval equal to the timer setpoint has elapsed.

13. The system for managing powdered activated carbon (PAC) injections of claim 11 wherein the component for comparing the mercury concentration value to the mercury setpoint applies a dead band range above and below the mercury setpoint in which the PAC injection rate is left unchanged.

14. The system for managing powdered activated carbon (PAC) injections of claim 11 further comprising a component for storing an economizer outlet temperature setpoint and a baghouse inlet temperature setpoint in the plant control system database.

15. The system for managing powdered activated carbon (PAC) injections of claim 14 further comprising a component for storing an economizer outlet temperature and a baghouse inlet temperature in the plant control system database.

16. The system for managing powdered activated carbon (PAC) injections of claim 15 further comprising a component for comparing the baghouse inlet temperature with the baghouse inlet temperature setpoint, and if the baghouse inlet temperature exceeds the baghouse inlet temperature setpoint, comparing the economizer outlet temperature with the economizer outlet temperature setpoint.

17. The system for managing powdered activated carbon (PAC) injections of claim 16 further comprising a component for initiating a soot blowing pattern in the boiler to reduce the economizer outlet temperature if the economizer outlet temperature exceeds the economizer outlet temperature setpoint.

18. A computer program product for managing powdered activated carbon (PAC) injections for controlling mercury emissions from coal-fired boilers when executed on a plant control system, the computer program product comprising a non-transitory computer readable medium having computer readable code embedded therein, the computer readable medium comprising:

program instructions that store (i) an operator selectable setpoint for a mercury concentration in flue gases, and (ii) a timer setpoint for checking the mercury concentration in flue gases exiting through a gas exhaust stack in a plant control system database;

program instructions that store a mercury concentration value received from a mercury continuous emissions monitor in the plant control system database;

program instructions that store a PAC injection rate from an activated carbon injection system in the plant control system database;

program instructions that determine if the processing logic for managing PAC injections is running on a plant control system;

program instructions that read the mercury concentration setpoint, the mercury concentration value, the timer setpoint, and a rate of PAC injection from the plant control system database;

program instructions that compare the mercury concentration value to the mercury setpoint;

program instructions that compare the PAC injection rate to a PAC injection threshold value;

program instructions that enable a signal from the plant control system to the activated carbon injection system to increase PAC injection by a predetermined amount, if the mercury concentration value is greater than the mercury setpoint and if the PAC injection rate exceeds the PAC injection threshold value; and program instructions that enable a signal from the plant control system to the activated carbon injection system to decrease PAC injection by a predetermined amount, if the mercury concentration is less than the mercury setpoint and if the PAC injection rate exceeds the PAC injection threshold value.

19. The computer program product for managing powdered activated carbon (PAC) injections of claim 18 further comprising program instructions that recheck the mercury concentration in flue gases after a time interval equal to the timer setpoint has elapsed.

20. The computer program product for managing powdered activated carbon (PAC) injections of claim 18 further comprising program instructions that apply a dead band range above and below the mercury setpoint in which the PAC injection rate is left unchanged.

21. The computer program product for managing powdered activated carbon (PAC) injections of claim 18 further comprising program instructions that store an economizer outlet temperature setpoint and a baghouse inlet temperature setpoint in the plant control system database.

22. The computer program product for managing powdered activated carbon (PAC) injections of claim 21 further comprising program instructions that store an economizer outlet temperature and a baghouse inlet temperature in the plant control system database.

23. The computer program product for managing powdered activated carbon (PAC) injections of claim 22 further comprising program instructions that compare the baghouse inlet temperature with the baghouse inlet temperature setpoint, and if the baghouse inlet temperature exceeds the baghouse inlet temperature setpoint, compare the economizer outlet temperature with the economizer outlet temperature setpoint.

24. The computer program product for managing powdered activated carbon (PAC) injections of claim 23 further comprising program instructions that initiate a soot blowing pattern in the boiler to reduce the economizer outlet temperature if the economizer outlet temperature exceeds the economizer outlet temperature setpoint.

* * * * *